United States Patent [19]
Takamatsu et al.

[11] Patent Number: 6,149,346
[45] Date of Patent: Nov. 21, 2000

[54] METHOD FOR REPLACEMENT OF EXISTING PIPES AND DEVICE FOR CARRYING OUT THE METHOD

[75] Inventors: Nobuhisa Takamatsu; Takayuki Kurobe; Toshio Hirai, all of Nagoya; Toshio Akesaka, Yokohama, all of Japan

[73] Assignees: Toho Gas Co., Ltd., Aichi-ken; Kabushiki Kaisha Isekikaihatsukohki, Tokyo, both of Japan

[21] Appl. No.: 09/059,298

[22] Filed: Apr. 14, 1998

[30] Foreign Application Priority Data

Apr. 16, 1997 [JP] Japan ..................................... 9-098889

[51] Int. Cl.[7] ................................................. F16L 55/18
[52] U.S. Cl. ............................................ 405/156; 405/184
[58] Field of Search ..................................... 405/184, 154, 405/156; 175/22, 19

[56] References Cited

U.S. PATENT DOCUMENTS

| | | | |
|---|---|---|---|
| 3,181,302 | 5/1965 | Lindsay | 405/156 |
| 4,903,406 | 2/1990 | Schosek et al. | 405/156 |
| 5,076,731 | 12/1991 | Luksch | 405/184 |
| 5,078,546 | 1/1992 | Fisk et al | 405/184 |
| 5,098,225 | 3/1992 | Rockower et al. | 405/156 |
| 5,173,009 | 12/1992 | Moriarty | 405/184 |
| 5,439,320 | 8/1995 | Abrams | 405/184 |
| 5,544,977 | 8/1996 | Cravy et al. | 405/154 |

*Primary Examiner*—Eileen Dunn Lillis
*Assistant Examiner*—Frederick L. Lagman
*Attorney, Agent, or Firm*—Townsend & Banta

[57] ABSTRACT

A drawing device 4 is mounted in a drawing shaft 3, and pipe replacement device A connected with new pipes is arranged on the side of starting shaft 2, wherein the drawing device 4 and the pipe replacement device A is connected through pull-rods 5 inserted into existing pipes with each other. The pipe replacement device A is comprised of a cutting part 11 including cutter bodies 14 (shanks 14a to 14i) arranged in the axial direction and at angular intervals in the circumferential direction, an expanding part 12 having expanding rollers 18a to 18f, and a connecting part 13. Each cutter body 14 has a plurality of cutting edges, wherein distances between the respective cutting edges and the center of the circle become larger in order from the forward side toward the backward side. While the pipe replacement device A is traveled in the inside of cast iron pipes, the inner wall of cast iron pipes is cut by the cutter bodies 14 to form grooves. Splitting of existing pipes into arc-shaped pieces 1a is made starting from the grooves. Arc-shaped pieces 1a are pressed into the ground, by which a tunnel 7 surrounded by arc-shaped pieces 1a and portions of consolidated earth is formed, while new pipes 6 are introduced into the tunnel 7, and besides the new pipes 6 are protected by protective armors formed of arc-shaped pieces 1a.

8 Claims, 14 Drawing Sheets

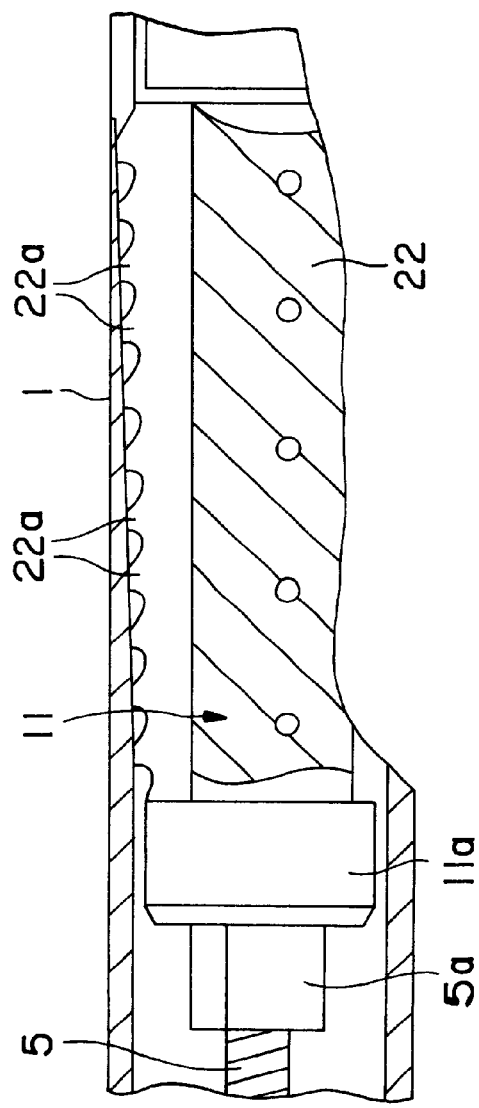
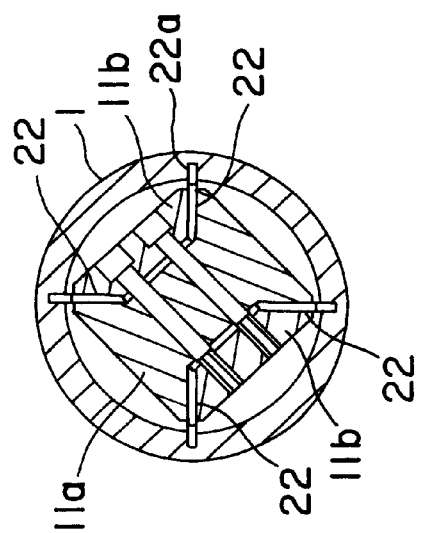
FIG. 15(a)
FIG. 15(b)

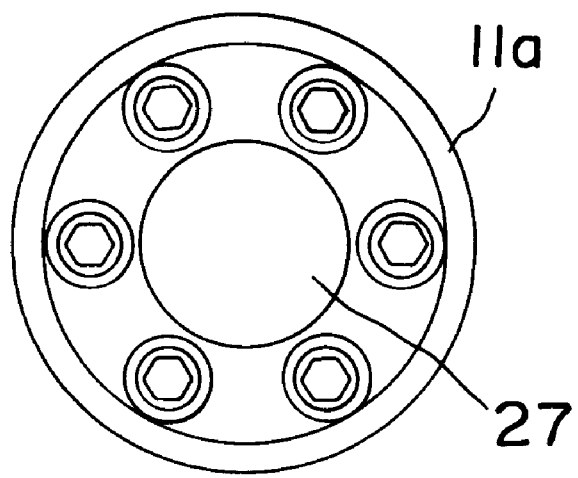
F I G. 17(a)
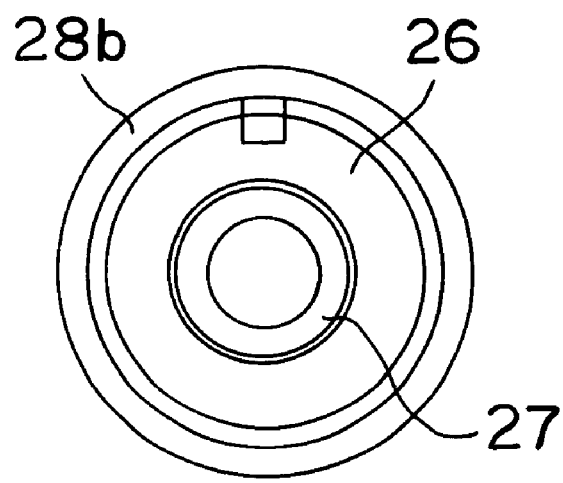
F I G. 17(b)

METHOD FOR REPLACEMENT OF EXISTING PIPES AND DEVICE FOR CARRYING OUT THE METHOD

BACKGROUND OF THE INVENTION (1) Field of the Invention

This invention relates to a method for replacement of existing pipes for replacing cast iron pipes buried in the ground with new pipes, and a device for carrying out the method.

(2) Description of the Prior Art

Many pipelines, for example, such as gas service pipelines for supplying fuel gas, water service pipelines for supplying service water and others, have been laid in the ground. Gas service pipelines have been built by a method in which steel pipes each having a given length are connected with each other through pipe joints such as sockets or welded with each other, or a method in which cast iron pipes are connected with each other through pipe joints.

It is known that it is feared that if strong earthquake force is applied to the above-mentioned gas service pipelines made of steel pipes or cast iron pipes, a part of pipe joints or other parts are broken and so gas leak occurs to cause a big disaster. Therefore, as to gas service pipelines, it is carried out that steel pipes or cast iron pipes are replaced with pipes of synthetic resin having plasticity such as polyethylene and others or steel pipes whether large or small or the numbers of years which have passed since the gas pipelines were constructed.

There is a case where when existing pipes buried in the ground is replaced with new pipes, a method of construction in which a road is open-cut or trenched along existing pipes is employed. However, in this method of construction, there is a case where open-cutting of a road has a wrong effect on circumstances of traffic on the periphery of the road. Accordingly, recently, a method of construction has been proposed in which existing pipes are cut in the longitudinal direction into plural parts and expanded in the radial direction to form a tunnel, and then new pipes are introduced into the tunnel by which the existing pipes are replaced with new pipes.

For example, an art disclosed in Japanese Patent Laid-Open No. 266185 of 1990 (Heisei 2) prior art) relates to "a device for replacing existing pipes with new pipes", which is comprised of a clamping means for pushing inner walls of existing pipes, a notch-forming cutter for forming notches in the axial direction in the inner walls of pipes, a cylinder for traveling which is arranged so as to be able to extend and contract in the axial direction, and a pipe-expanding means for expanding the inner walls of pipes to split the inner walls along the notches, wherein the clamping means, the notch-forming cutter, the cylinder for traveling and the pipe-expanding means are connected with each other to stand in a line, and wherein new pipes are connected with the back portion of the pipe-expanding means. In this art, by operating the cylinder for traveling while pushing the inner walls of pipes through the clamping means, a function part connected with the cylinder for traveling behind the clamping means is traveled while notches are formed in the inner walls of pipes, the pipe-expanding means is moved so as to split the inner walls of pipes along the notches, and at the same times new pipes are introduced into the split inner walls of pipes. Namely, while the notch-forming cutter and the pipe-expanding means are moved forward intermittently into existing pipes in such a manner as a measuring worm, existing pipes are replaced with new pipes. In this art, it is said that it is possible to replace existing pipes with new pipes in one process, and this art can be applied to existing pipes including cast iron pipes. Further, an art disclosed in Japanese Patent Laid-Open No. 238509 of 1994 (Heisei 6) (second prior art) relates to "an cutting and expanding tool", wherein a guide roller and a cutter are mounted on a supporting body along the longitudinal axial line thereof. In this art, bottom portions of main pipes are cut along the axial line of the pipes. Further, when an expander is connected with the supporting body, the main pipes which has been cut by the expander is expanded by the expander to form a tunnel wherein the expanded main pipes function as a roof.

In the first prior art, a plurality of hydraulic machines are used in the clamping means, the cylinder for traveling or the pipe-expanding means. Therefore, there are a problem that since the whole device is necessarily made oversized, this device cannot be applied to existing pipes having small inner diameter, and a problem that although it is possible to replace existing pipes with new pipes in one process, traveling of the device and traveling of new pipes are made in such a manner as measuring worm so that a lot of time is required for construction per unit length.

Particularly, when replacing existing pipes now in use represented by them of gas service pipelines with new pipes, it is indispensable for the replacement of existing pipes with new pipes to be carried out in such a short time that influence upon each home is not exerted seriously. Therefore, it is important how long length of existing pipes can be replaced with new pipes per unit time. Further, in the second prior art, the supporting body is connected with the expander, the supporting body and the expander are arranged into main pipes, and traveled continuously, by which cutting and expanding of the main pipes are carried out. When the second prior art is applied to steel pipes, good results can be got. On the other hand, when the second prior art is applied to cast iron pipes having lower elastic modules as compared with that of steel pipes, there is a problem that splitting of walls of pipes in the axial direction is possible, but main pipes made of cast iron are broken to pieces in an uncontrolled condition when the main pipes made of cast iron are expanded.

Further, in the second prior art, there is a problem that since new pipes are restricted to pipes having outer diameters which allows pipes to be inserted into main pipes which have been expanded along the axial direction, it is impossible to replace existing pipes with a new pipeline having larger outer diameter as compared with that of the existing pipes.

Furthermore, from what inventors of this invention made an experiment, it has become clear that in case of forming grooves in inner walls of cast iron pipes, grooves cannot be formed in inner walls of cast iron pipes merely by rotary cutter being arranged. Namely, in this case, rotary cutters should be driven actively. Therefore, there is a problem that in case of the existing pipes having small inner diameter, rotary cutters cannot be applied for forming the driving system.

BRIEF SUMMARY OF INVENTION

Accordingly, it is an object of the present invention to provide a method of replacement of existing pipes in which it is possible to replace existing pipes made of cast iron buried in the ground with new pipes having the same inner diameter as that of the existing pipes or larger inner diameter than that of the existing pipes whether large or small of inner diameter of existing pipes, and existing pipes split in the longitudinal direction can be used for components of new pipeline.

It is another object of the present invention to provide a pipe replacement device for carrying the above-mentioned method.

In order to achieve the above-mentioned object, a method for replacement of existing pipes buried in the ground with new pipes is characterized in that the method comprises the steps of: inserting cutting means including cutter bodies into the inside of existing pipes, wherein the cutter bodies are arranged at angular intervals in the circumferential direction and each of the cutter body has cutting edges arranged in a line and positioned in such a manner that distances between the respective cutting edges and the center of the circle become larger in order from the forward side toward the backward side of the cutting means; traveling the cutter means from the forward side toward the backward side of the existing pipes in the existing pipes, thereby forming a plurality of grooves running in the axial direction of the existing pipe, and traveling, following the cutting means, a plurality of expanding rollers which are arranged at axial intervals and positioned between cutter bodies being adjacent to each other in the circumferential direction, thereby splitting, starting from the grooves, the existing pipes into a plurality of arc-shaped pieces continuing in the longitudinal direction and pressing the arc-shaped pieces into the ground while deflecting them within the limit of elasticity of material of existing pipes in such a direction that distances between the respective arc-shaped pieces and the center of the existing pipes can be made larger from the forward side toward the backward side of the existing pipes, by which a space surrounded by the arc-shaped pieces and portions of consolidated ground can be formed; and introducing new pipes into the spaces, by which the new pipes can be buried while protective armors formed of the arc-shaped pieces are arranged around the buried new pipes.

In the above-mentioned method of replacement of existing pipes, cutting means including cutter bodies is inserted into existing pipes, wherein the cutter bodies are arranged at angular intervals in the circumferential direction and each of the cutter body has cutting edges arranged in a line and positioned in such a manner that distances between the respective cutting edges and the center of the circle become larger in order from the forward side toward the backward side of the cutting means. The inner wall of the existing pipes are cut by moving forward the cutting means so that the grooves can be formed and grown. Further, the existing pipes are split starting from the grooves through expanding means following the expanding means so that a plurality of arc-shaped pieces can be formed.

The above-mentioned arc-shaped pieces acts as cantilevers having, as supporting points, connecting points of the arc-shaped pieces with the existing pipes (starting points at which a change is made from the existing pipes into arc-shaped pieces). Therefore, by applying to arc-shaped pieces a force in such a direction that radius of a circle formed of arc-shaped pieces can be increased according to the radial positions of expanding rollers, deflection within the limit of elasticity of material of the existing pipes can be produced. As a result, arc-shaped pieces are pressed into the ground against the earth pressure, and at the same times earth in spaces between arc-shaped pieces being adjacent to each other are pushed out so that the ground can be consolidated, and a space protected by armors formed of arc-shaped pieces and portions of consolidated ground (tunnel) can be formed. Accordingly, by introducing new pipes into the tunnel, replacement of existing pipes with new pipes can be made.

In the above-mentioned method, since existing pipes are split into a plurality of arc-shaped pieces being adjacent to each other in the circumferential direction, it is unnecessary to further expand a circle formed of arc-shaped pieces into which existing pipes have been split. Expanding of a circle formed of arc-shaped pieces can be made by merely producing deflection within the limit of elasticity of material of the existing pipes in the longitudinal direction.

In the method of replacement of existing pipes it is desirable that expanding of existing pipes with the grooves in the diametral direction perpendicularly to the grooves is made so that the existing pipes can be split starting from the grooves, while splitting of joints of the existing pipes, sleeves for branch pipes or repairing parts is made by rotary cutters positioned corresponding to the grooves. In such a manner, by expanding the existing pipes with the grooves in the diametral direction perpendicularly to the grooves, splitting of the existing pipes starting from the grooves can be made, and splitting of joints of the existing pipes, sleeves for branch pipe or repairing parts can be made by rotary cutters positioned corresponding to the grooves.

Further, a pipe replacement device of the present invention is characterized in that the device is traveled in the existing pipes to be replaced in such a manner that the existing pipes can be split in the longitudinal direction into a plurality of arc-shaped pieces, the arc-shaped pieces are pressed into the ground so as to form a space surrounded by a plurality of the arc-shaped pieces and portions of consolidated ground, and then introducing of new pipes into the space is made, the pipe replacement device comprising cutting means arranged on the forward side of the device, an expanding means following the cutting means, and a connecting means following the expanding means, wherein the cutting means is provided with cutter bodies, each of the cutter bodies including a plurality of cutting edges arranged in a line, and the cutter bodies being positioned at angular intervals in the circumferential direction, wherein distances between the respective cutting edges and the center of the circle become larger in order from the forward side toward the backward side of the cutting means, and the expanding means has groups of expanding rollers, the groups of expanding rollers being arranged at axial intervals and positioned between cutter bodies being adjacent to each other in the circumferential direction, wherein expanding rollers positioned on the forward side out of the groups of expanding rollers can split the existing pipes into a plurality of arc-shaped pieces continuing in the longitudinal direction, while deflecting the arc-shaped pieces within the limit of elasticity of material of the existing pipes centering on points being away from the arc-shaped pieces toward the outside thereof, and wherein the connecting means has a chuck for connecting the expanding means with the pipes.

In the above-mentioned pipe replacement device, since distances between a center of the cutter bodies and tips of cutting edges become larger in order from the forward side toward the backward side of the cutting means, the grooves can be formed and grown in the inner walls of the existing pipes. Further, arc-shaped pieces can be deflected centering on points being away from the arc-shaped pieces toward the outside thereof in such a direction that radius of a circle formed of arc-shaped pieces can be increased, and then the arc-shaped pieces deflected outward can be deflected inward centering on points being away from the arc-shaped pieces toward the inside of the existing pipes, through expanding rollers following the expanding rollers positioned on the forward side.

Accordingly, while traveling the pipe replacement device in the existing pipes, splitting of the existing pipes into arc-shaped pieces, deflecting of the arc-shaped pieces, pressing of the deflected arc-shaped pieces into the ground and consolidation of the ground are carried simultaneously so that a tunnel can be formed. Further, by connecting of new pipes with the pipe replacement device through the chuck provided at the connecting means, the formation of tunnel and drawing of new pipes into the tunnel can be simultaneously so that new pipes can be buried, and besides a plurality of the arc-shaped pieces as protective armors arranged around new pipes are made come closely into contact with the outside of new pipes under the influence of the ground as the time proceeds so that a new pipeline can be formed of new pipes and protective armors which are arranged around the new pipes. Accordingly, even if synthetic resin pipes having plasticity such as polyethylene pipes, polyvinyl chloride or steel pipes are used for new pipes, a stout pipeline protected by protective divided pieces of cast iron pipes can be formed, and besides since arc-shaped pieces are located leaving gaps between arc-shaped pieces being adjacent to each other in the circumferential direction around new pipes, pliability of new pipes are not damaged, or a new pipeline can have higher strength than that of the existing pipeline.

In the above-mentioned pipe replacement device, it is desirable that each of the cutter bodies comprises a plurality of plate-like shanks arranged coaxially wherein carbide tips are planted on the outside of the respective shanks at angular interval in the circumferential direction to form the cutting edges and distances between a center of the respective shanks and tips of the cutting edges on the respective shanks differ from each other, wherein the shanks are mounted on a main body in such a manner that distances between a center of the main body and tips of the respective cutting edges become larger in order from the forward side toward the backward side of the main body and a plurality of cutter bodies, each of the cutter bodies having the cutting edges arranged in a line are formed, by which the cutting means are formed of the catting bodies, or that the cutting bodies comprise continuous cutting edges formed in such a manner that distances between a center of the cutting means and tips of the cutting edges become larger in order from the forward side toward the backward side of the cutter bodies and wherein the continuous cutting edges are mounted in a main body at circumferential intervals to form the cutting means.

In case of any of the above-mentioned cutter bodies, grooves can be formed by cutting the inner walls of existing pipes step by step by the respective cutting edges.

In the above-mentioned pipe replacement device, it is desirable that the cutter bodies are provided with side expanding rollers on the backward side of the cutter bodies, the side expanding rollers expanding the existing pipes in the diametral direction in such a manner that the width of groove positioning along a line intersecting perpendicularly to the diametral direction can be increased, wherein the side expanding rollers are provided with rotary cutters for splitting of joints the existing pipes, sleeves for branch or replacing parts at the backward side of the side expanding rollers. In such a manner, by side expanding rollers and rotary cutters provided in the pipe replacement device, the existing pipes having a plurality of the grooves in the inner walls thereof can be split into arc-shaped pieces, and besides joints of the existing pipes for connection of existing pipes, sleeves for branch pipe used for making existing pipe branch off into branch pipe, or repairing parts attached to existing pipe for repairing existing pipe can be split by applying great force in the diametral direction which corresponds to the arrangement direction of the side expanding rollers to the joints of the existing pipes, sleeves for branch pipe, or repairing parts, and thereafter cutting the joints of the existing pipes, sleeves for branch pipe, or repairing parts by rotary cutters.

It is desirable that each of the side expanding rollers has cylindrical surface in central portion in the direction of the thickness of the outer surface of each side expanding roller and curved or tapered surfaces adjacent to the cylindrical surface on upper and lower sides of the cylindrical surface, and wherein the curved or tapered surfaces are brought into contact with the inner wall of the existing pipes, while the cylindrical surfaces of the side expanding rollers are brought into contact with each other. By forming the side expanding rollers as mentioned hereinabove, while a pair of rollers forming side expanding rollers are brought into contact with each other in a stable state, a force can be applied to existing pipes.

Further, in the above-mentioned pipe replacement device, it is desirable that the expanding means has a tapered main body, a plurality of the expanding rollers are arranged about a point on an axial center line, each of the expanding rollers has a circumferential surface and both tapered laterals adjacent to the circumferential surface, said circumferential surface is brought into contact with the inner wall of the existing pipes while the tapered laterals are brought into contact with each other. By forming a plurality of expanding rollers as mentioned hereinabove, when deflection is produced in arc-shaped pieces into which existing pipes have been split, force such as the ground pressure and force needed for deflecting arc-shaped pieces applied on each expanding rollers can be supported to each other. Therefore, the expanding rollers can show enough high strength, even when supporting shafts of the expanding rollers so that smooth rotation of the expanding rollers can be achieved. Further, in the above-mentioned pipe replacement device, it is desirable that the pipe replacement device comprises guides for adjusting a space between arc-shaped pieces formed of by splitting of the existing pipes while a circle formed of the adjacent arc-shaped pieces are expanded, at positions which corresponds to the positions of the cutting edges of the cutting means, on the outside of the tapered laterals. By such a guide provided in the device, while expanding a circle of arc-shaped pieces by the expanding means, pressing of arc-shaped pieces into the ground can be made with keeping equally the distance between arc-shaped pieces being adjacent to each other.

BRIEF DESCRIPTION OF THE DRAWINGS

In the drawings:

FIGS. 15 are views for explaining the construction of another example of cutting means.

FIGS. 17 are views for explaining joint section, namely sectional views at line XVII-a and XVII-b.

DETAILED DESCRIPTION

Figure 1:
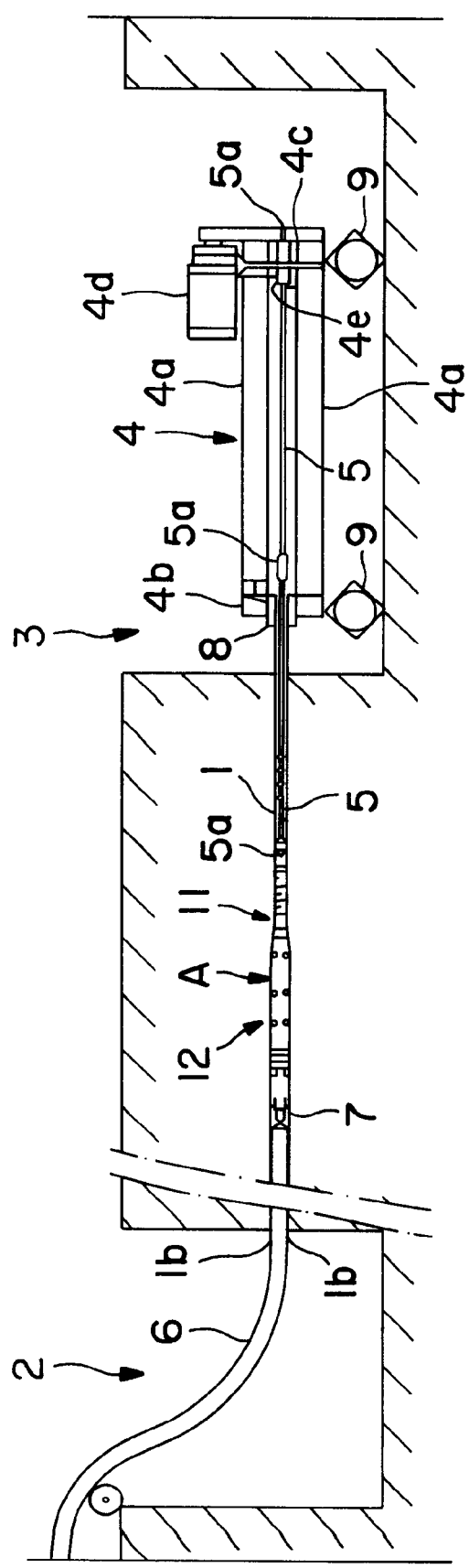
FIG. 1 is a view for showing the procedure for carrying out a method for replacement of existing pipes according to an example of the present invention.
Figure 2:
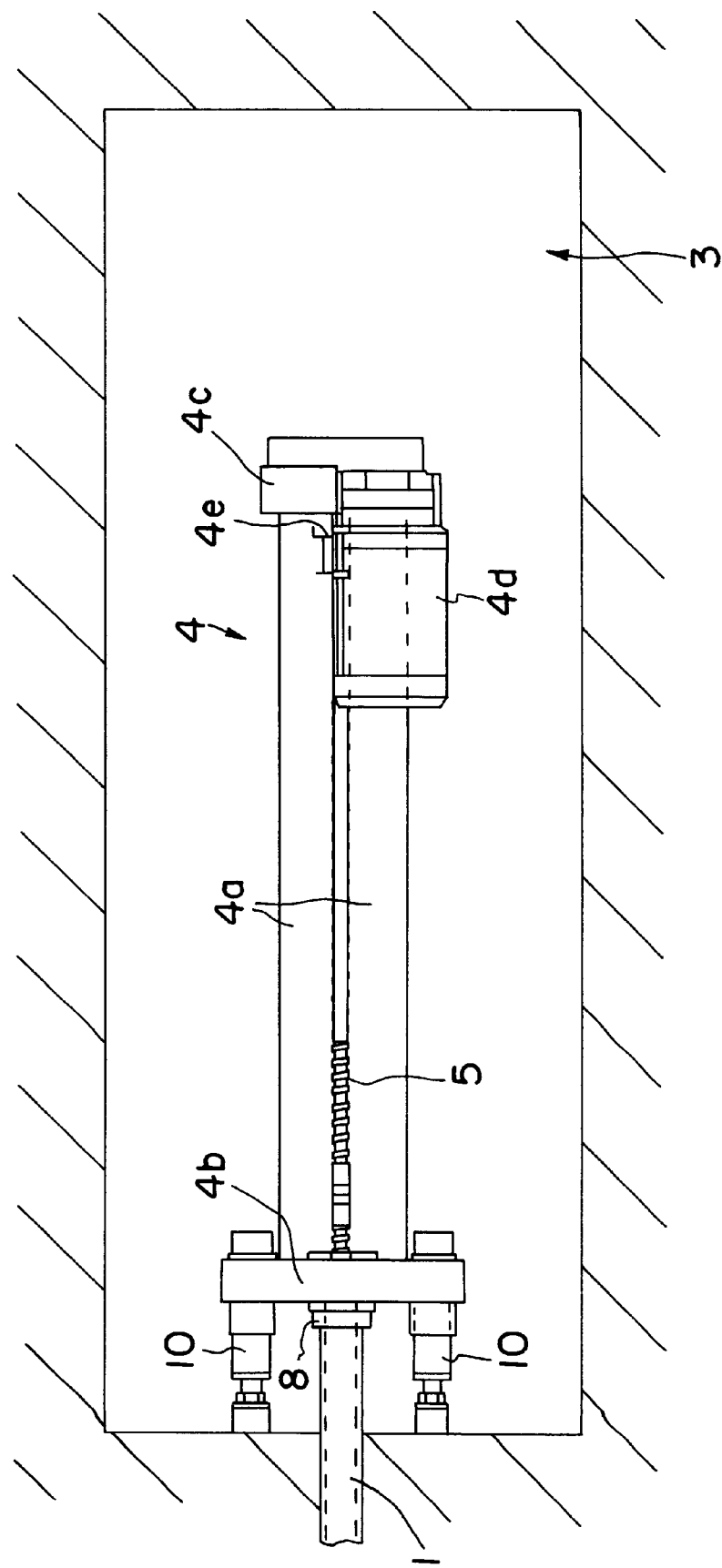
FIG. 2 is a top view of a drawing shaft.

A method for replacement of existing pipes and a pipe replacement device according to the present invention become possible to carry out a construction of replacing cast iron pipes of existing gas pipeline having the small diameter of about 75 A to 200 A with new pipes having the same inner diameter as that of the above-mentioned pipes or having inner diameter being above one rank higher than that of the above-mentioned pipes, wherein it is possible to achieve high drawing velocities of the device without requiring high power.

In this example, a case where cast iron pipes of gas service pipeline are replaced with synthetic resin pipes having plasticity is explained. However, this invention is not limited to this example. For example, this invention can be applied for cast iron pipes of service water pipeline having the fixed lining on the inside thereof. Further, in this invention, steel pipes can be also used for new pipes.

In the drawings, a starting shaft 2 and a drawing shaft or arrival shaft 3 are provided at given positions in a gas service pipeline made of cast iron pipes 1 wherein the positions are set at a distance from each other according to a replacement length that construction of replacement is possible within a time belt without exerting a bad influence upon life of residents. A drawing device 4 is arranged in drawing shaft 3. First, pull-rods 5 drawn by drawing device 4 are inserted into the inside of cast iron pipes 1. Pipe replacement device A of the first embodiment is connected with a front end of the pull-lods 5. Further, polyethylene (PE) pipes 6 as new pipes (replacement pipes) are connected with pipe replacement device A.

Figure 6:
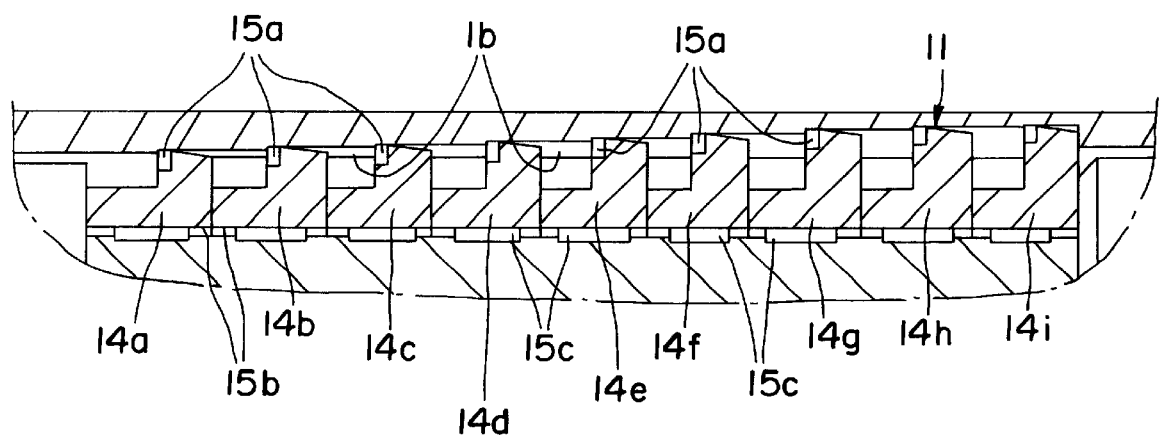
FIG. 6 is a view for showing the process of forming grooves in walls of existing pipes by the cutting means.

Then, pull-rods 5 are drawn toward drawing shaft 3 by operating drawing device 4 so that tractive force is given to pipe replacement device A, by which the pipe replacement device A is moved forward in cast iron pipes A. Together with this movement of replacement device A, cast iron pipes 1 are split into a plurality of arc-shaped pieces (arc-shaped pieces 1a as shown in FIG. 6), while the arc-shaped pieces 1a are deflected in such a direction that the radius of a circle formed of arc-shaped pieces is increased so that tunnel 7 with an inner diameter sufficiently larger than cast iron pipes 1 and having a surrounding wall made of a plurality of arc-shaped pieces 1a and consolidated earth can be formed while pushing the arc-shaped pieces 1a into the earth; by which a new pipeline can be formed of PE pipes wherein a plurality of arc-shaped pieces 1a are arranged around the PE pipes as protective armors as mentioned hereinafter.

Starting shaft 2 and drawing shaft 3 are provided by excavating both shaft 2, 3 from the ground. End portion of cast iron pipes 1 is cut in such a situation that the end portion thereof projects into the starting shaft 2 from the wall of starting shaft 2, while a guide 1b for drawing of pipe replacement device A is attached to the cast iron pipe 1 on the side of starting shaft 2. Further, drawing device 4 is attached to the cast iron pipe 1 on the side of drawing shaft 3.

Drawing device 4 is comprised of frames 4a each having gearing part (not shown in the drawings) such as ball-type screw therein wherein the frames are arranged in parallel with each other, a front platen or front end plate 4b wherein one end portions of the frames 4a are connected with the front platen 4b, a pipe fixture 8 mounted at the center of the front platen 4b wherein one end portion of cast iron pipe 1 is securely attached to the pipe fixture 8 and pull-rod 5 is inserted into the pipe fixture 8, a rear platen or rear end plate 4c wherein the other end portion of the frames 4a are connected with the rear platen and the rear platen 4c is formed leaving a space through which pull-rod 5 can pass, a motor 4d mounted on the frame 4a, gearing system (not shown in the drawings) for transmitting rotation of the motor 4d to the ball-type screw, and a rod fixture 4e arranged between two frames 4a wherein the rod fixture 4e is engaged with the pull-rod (coupler 5a) so that the pull-rod 5 can be securely attached to the rod fixture 4e.

Drawing device 4 is mounted within drawing shaft 3 and adjusted in such a level that traveling path of rod fixture 4e is nearly consistent with the axial line of cast iron pipes 1. Therefore, two platens 4b, 4c are provided with jacks 9 for adjustment of level. Further, front platen 4b is provided with a pair of outriggers 10, which receives a reaction force when drawing pull-rods 5.

A pull-rod 5 has a length which corresponds to a stroke of rod fixture 4e in drawing device 4 or is shorter than the stroke, and has the strength which makes possible to transmit driving force generated in motor 4d to pipe replacement device A. The pull-rods 5, which are connected with each other through couplers 5a and inserted into the inside of cast iron pipes 1, wherein a front end of the pull-rods is connected with pipe replacement device A, and a rear end of the pull-rods is fixed to rod fixture 4e of drawing device 4.

Figure 3:
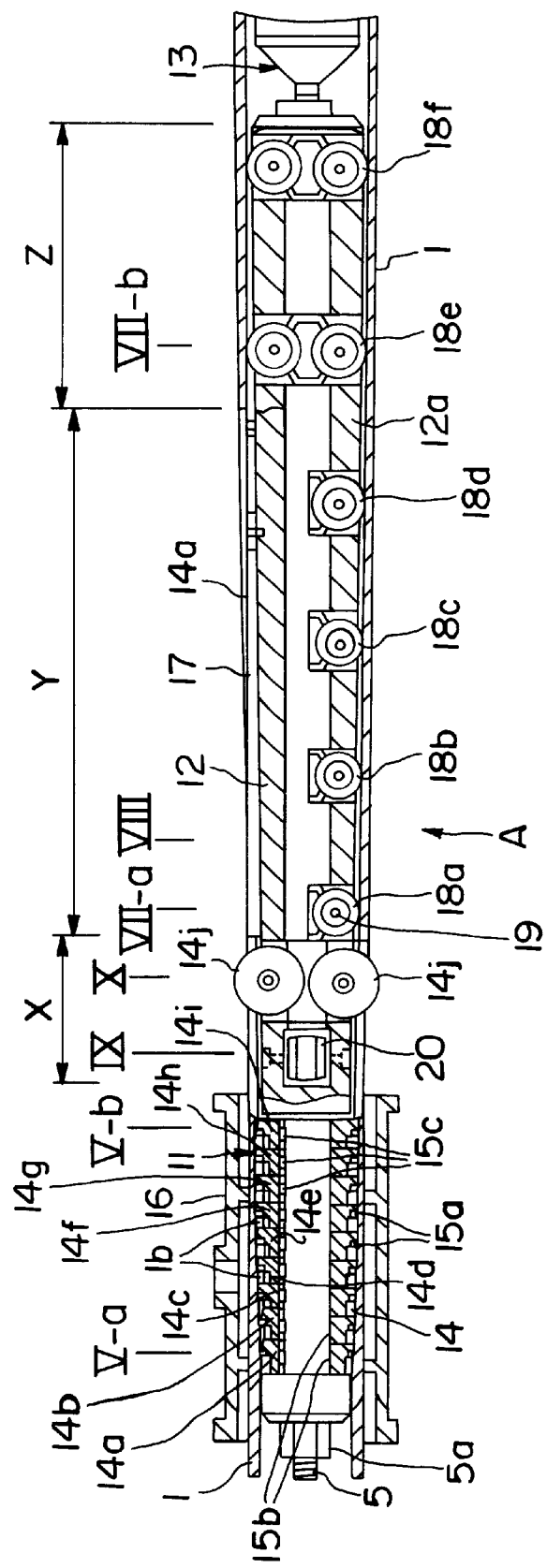
FIG. 3 is a view for showing the relation between the construction of the pipe replacement device and existing pipes regarding the first embodiment.

The structure of pipe replacement device A of the first embodiment is explained concretely as follows. As shown in FIG. 3, pipe replacement device A is comprised of a cutting part 11 as cutting means in which a plurality of grooves 1b are formed in the inner wall of cast iron pipes 1, and the cast iron pipes are split starting from the grooves 11 into arc-shaped pieces 1a, an expanding part 12 as expanding means in which arc-shaped pieces 1a are deflected, pressed into the ground while consolidating the ground, and connecting part 13 as connecting means for connecting PE pipes 6 as new pipes with the pipe replacement device.

Figure 7A:
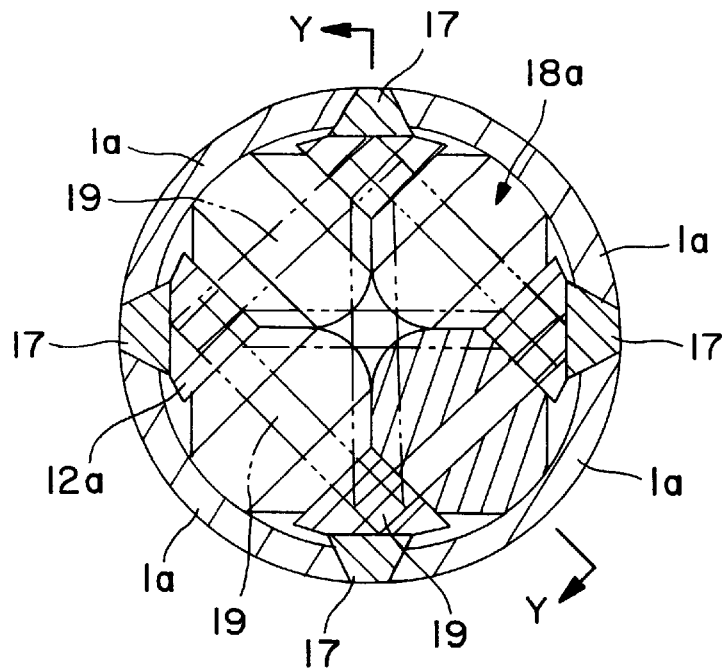
FIGS. 7(a), (b) are sectional view taken in VII-a, and in VII-b of FIG. 3, respectively, for showing the arrangement of expanding rollers against the circumference of existing pipes.
Figure 7B:
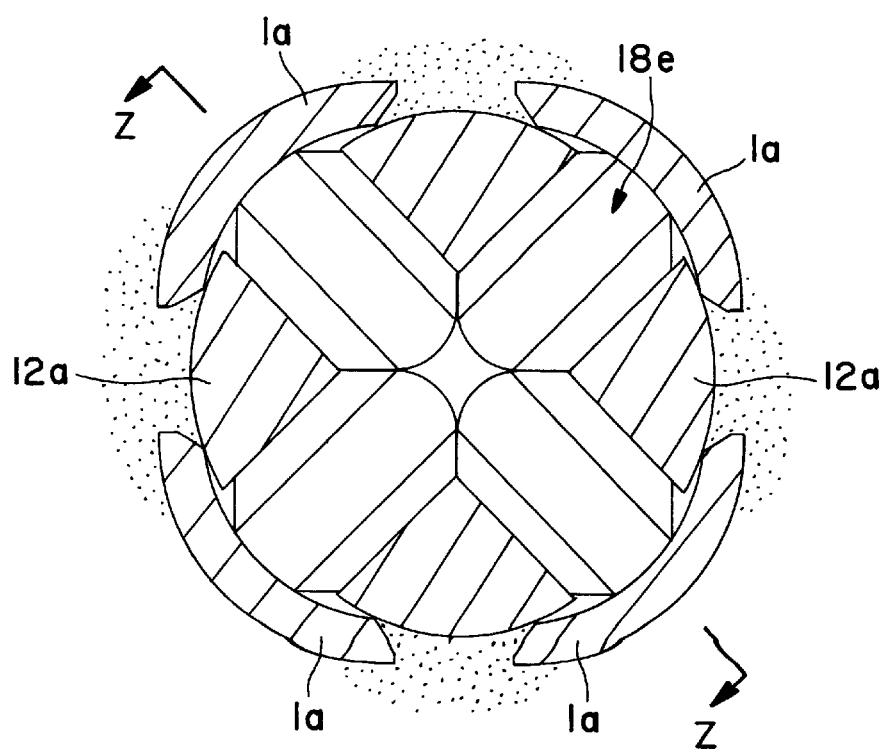
Figure 8:
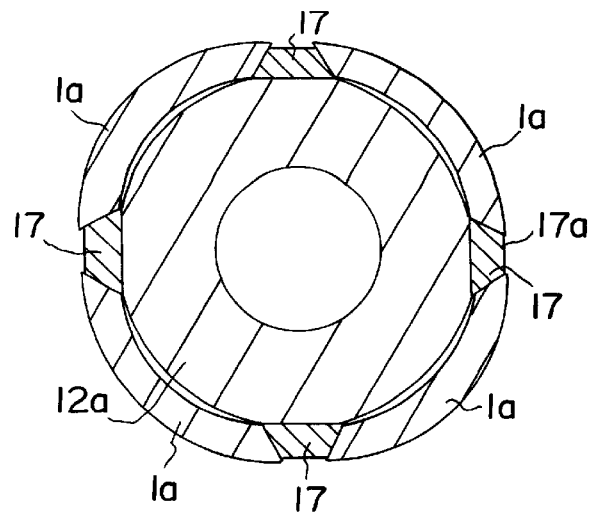
FIG. 8 is a sectional view taken in VIII of FIG. 3, for showing the relation between existing pipes and guides.
Figure 9:
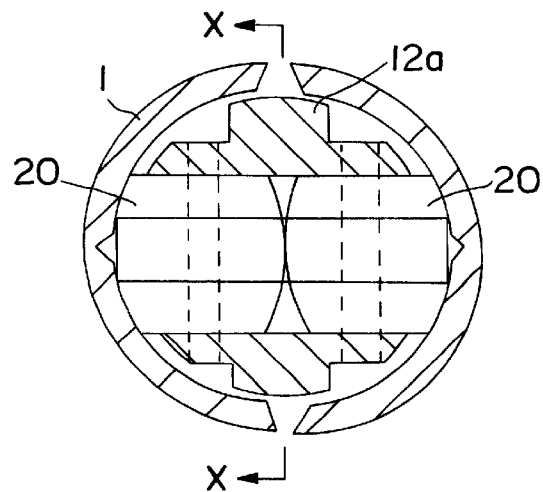
FIG. 9 is a sectional view taken in IX of FIG. 3.
Figure 10:
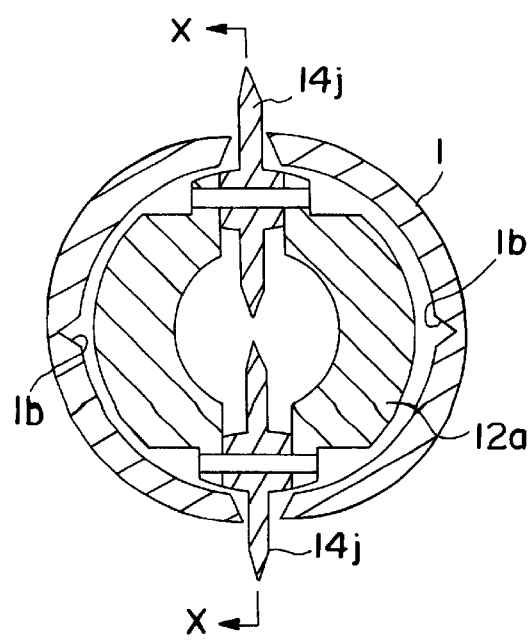
FIG. 10 is a sectional view taken in X of FIG. 3.
Figure 11:
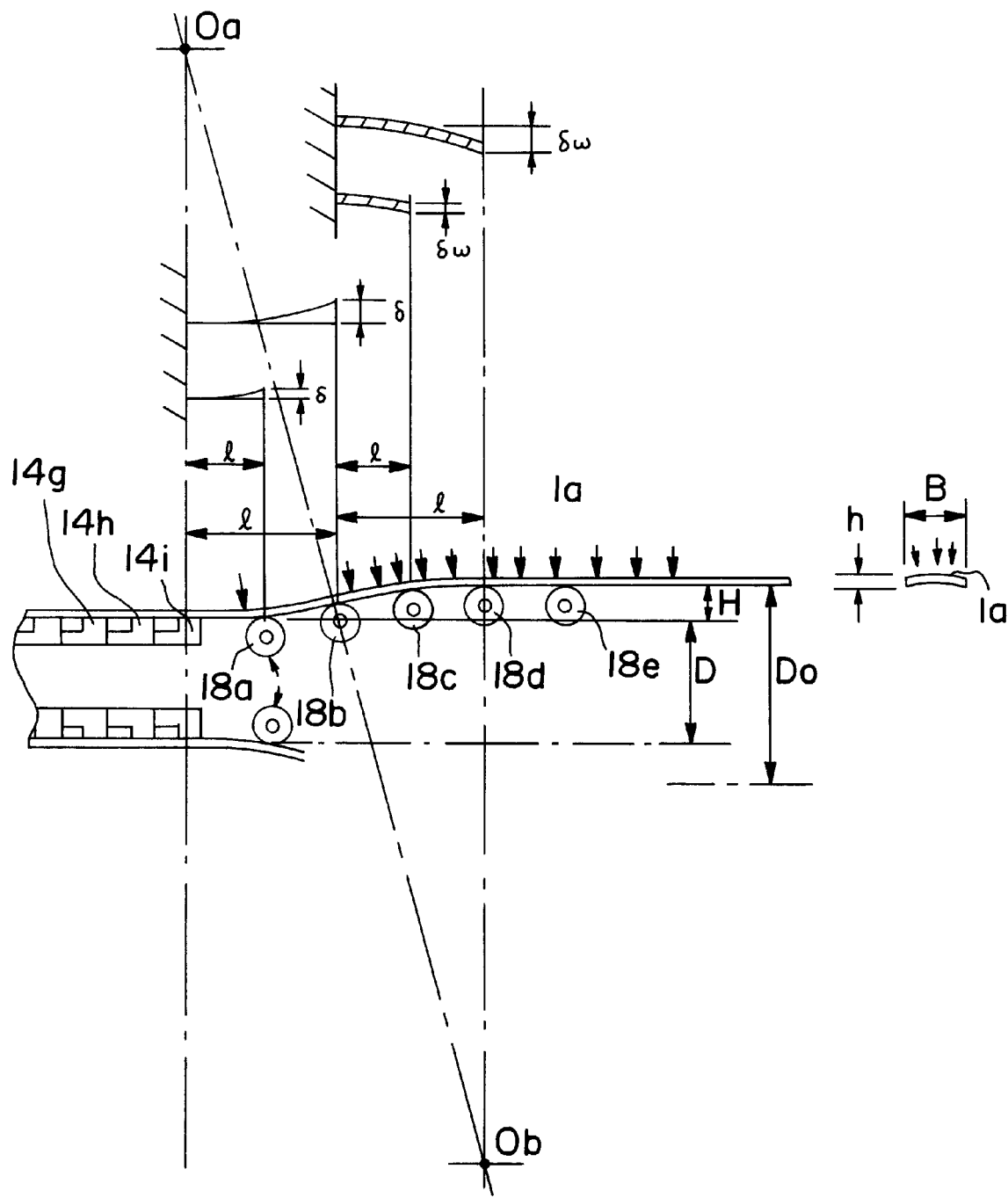
FIG. 11 is a view for explaining the direction of deflection of when deflecting arc-shaped pieces into which existing pipes are cut and the principle thereof.

In FIG. 3, section of expanding part 12 in region X of FIG. 3 is shown as sectional view taken in X—X of FIGS. 9 and 10, section of expanding part 12 in region Y is shown as sectional view in Y—Y of FIG. (a), and section of expanding part 12 in region Z is shown as sectional view taken in Z—Z of FIG. 7(b). In the region X, side expanding roller 20 and rotary cutter 14j are arranged, and the region X is a region for achieving surely the splitting of cast iron pipes 1. Further, the region Y is a region for deflecting arc-shaped pieces 1a in such a direction that inner diameter of cast iron pipes 1 are increased to press arc-shaped pieces 1a into the ground. Further, the region Z is a region for returning the deflected arc-shaped pieces 1a to the state where the arc-shaped pieces 1a are not deflected to run parallel to the center line of cast iron pipes.

Figure 4:
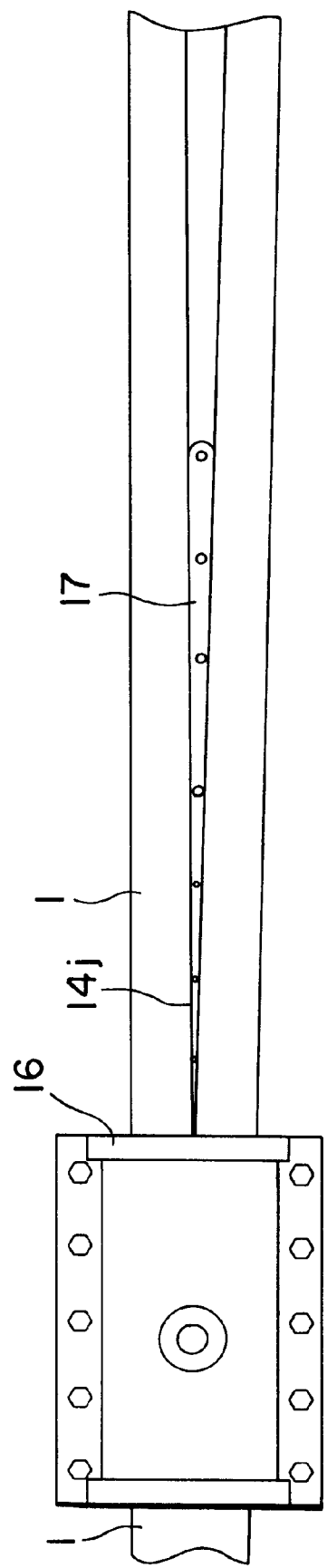
FIG. 4 is a top view showing the state of FIG. 3.
Figure 5A:
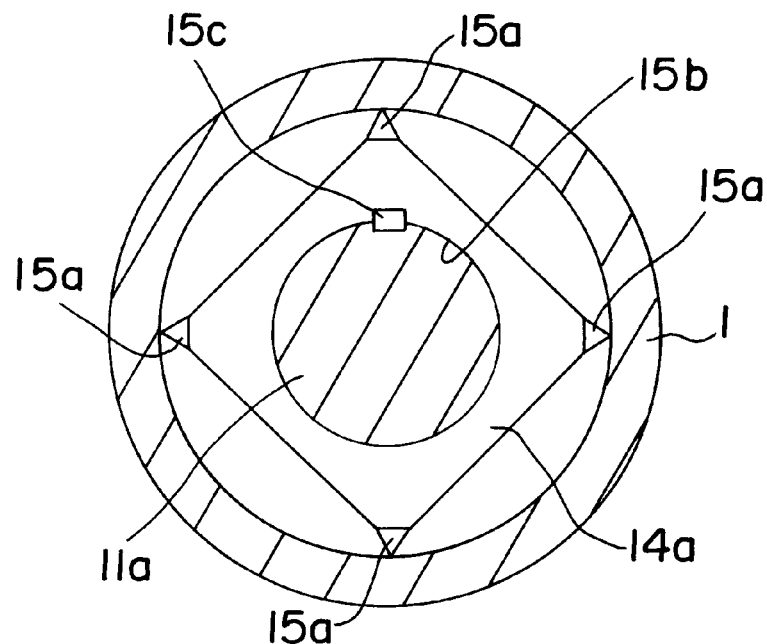
FIGS. 5(a), (b) are sectional views taken in V-a, and in V-b of FIG. 3, respectively, for showing the construction of a cutting means.
Figure 5B:
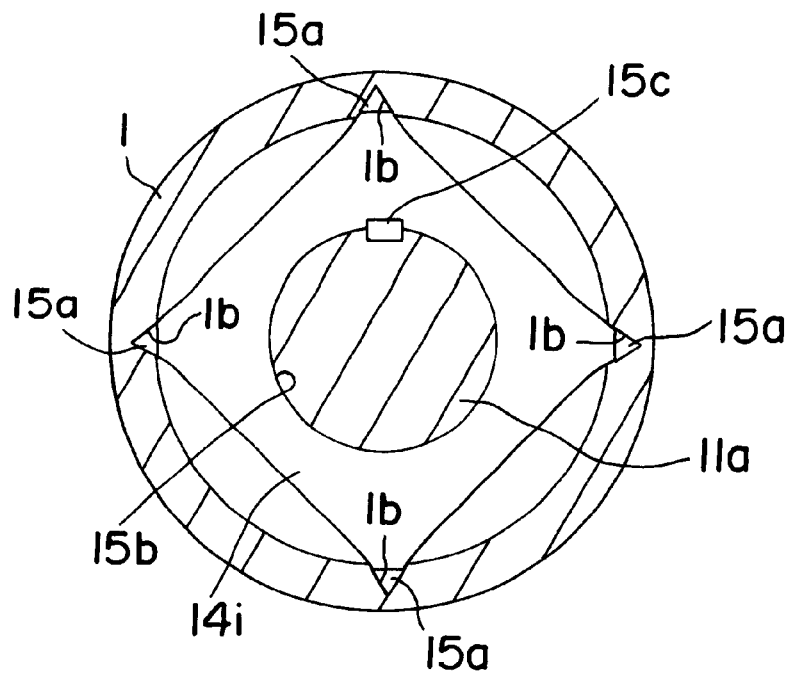

A main body 11a of the cutting part 11 is provided with a plurality of cutter bodies 14. The cutter bodies 14 includes a plurality of plate-like shanks 14a to 14i, which are mounted on the main body 14 in such a manner that turning of the shanks about the main body 11a is impossible. As shown in FIGS. 4 and 5, each of shanks 14a to 14i is formed into a nearly square shape, wherein carbide tip is planted at each apex of each shank to form cutting edge 15a. Further, shanks 14a to 14i are formed in such a manner that the lengths of diagonal lines of shanks 14a to 14e become larger in order from shank 14a to shank 14i, wherein each shank has a hole 15b for attaching the shank to main body 11a and key seat 15c for locating. Accordingly, shank 14a is disposed on the forward side of main body 11a (on the side of main body 11a to which pull-rod 5 is attached), and shanks 14b to 14i are disposed in order toward the backward side of main body 11a, by which it is possible to form a plurality of cutting edges 15a in cutting part 11 wherein cutting edges 15a are arranged in a line and positioned at positions set on a circle at regular angular intervals in such a manner that distances between tips of the respective cutting edges and a center of the main body becomes larger in order from the forward side toward the backward side.

A process for forming grooves in the inner wall of cast iron pipes 1 (thickness of wall 9 mm) is explained referring to FIGS. 5 and 6. Shanks 14a to 14i are formed in such a manner that the distance between tips of the respective cutting edges 15a and a center of main body 1a becomes larger in order from the forward side toward the backward side. First shank 14a disposed at the most forward side is formed such that the diameter of a circle connecting tips of cutting edges 15a is nearly equal to the inner diameter of cast iron pipes 1 when first shank 15a is mounted on main body 11a. Second shank 14b is formed into such a size that the diameter of a circle connecting tips of cutting edges 15a enables for cutting edges 15a to cut the wall of cast iron pipes 15a with the depth of cut of nearly 1 mm. Further, third shank 14c is formed into such a size that the diameter of a circle connecting tips of cutting edges 14a enables for cutting edges 15a to cut the wall of cast iron pipes 15a with the depth of cut of nearly 2 mm. Further, fourth shank 14d is formed into such a size that the diameter of a circle connecting tips of cutting edges 14d enables for cutting edges 15a to cut the wall of cast iron pipes 15a with the depth of cut of nearly 2 mm. In such a manner, the wall of cast iron pipes 1 are cut deeper in order and grooves 1b are grown.

Side expanding rollers 20 shown in FIG. 9 are arranged behind shank 14i, and rotary cutters 14j shown in FIG. 10 are arranged behind the side expanding roller 20.

Side expanding rollers 20 are comprised of two rollers arranged in the diametral direction of cast iron pipes 1 so that cast iron pipes 1 can be split starting from grooves 1b formed along a line intersecting perpendicularly to the diametral direction of cast iron pipes 1 into arc-shaped pieces, by giving a force in the diametral of cast iron pipes 1 to expand cast iron pipes 1. The above-mentioned two rollers has a cylindrical surface in a central part in the direction of the thickness on the outer side thereof, and both curved or tapered surfaces adjacent to the cylindrical surface on the upper and lower sides thereof. The cylindrical surface is brought into contact with each other, while the tapered surfaces are brought into contact with the inner wall of cast iron pipe 1. Accordingly, side expanding rollers 20 are brought into contact with cast iron pipe 1 at four points, by which a force of the diametral direction can be given to cast iron pipes 1 so that cast iron pipes 1 can be securely split into arc-shaped pieces.

Rotary cutters 14j are comprised of a pair of rotary cutting edges, which are arranged in the direction intersecting perpendicularly to the direction of force given to cast iron pipes 1 by side expanding rollers 20. This rotary cutter 14j are provided for splitting joints such as sockets for connecting cast iron pipes with each other, split sleeves (or split clamps) 16 as sleeves for branch pipe used for connecting a branch pipe with cast iron pipe 1, or replacing parts used for repairing partially a cast iron pipe, wherein rotary cutters 14i are formed in such a manner that a size of a line connecting a pair of rotary cutting edges become larger than the outer diameter of cast iron pipes 1.

Figure 12A:
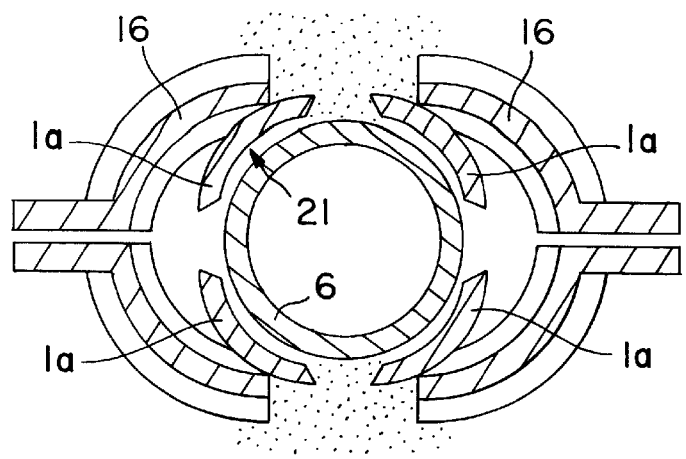
FIGS. 12(a), (b) are sectional views for showing the state of new pipe being buried.

As mentioned hereinabove, side expanding rollers 20 and rotary cutters 14j are arranged in the directions intersecting perpendicularly to each other and continuously, so that a force of the direction intersecting perpendicularly to the direction of splitting of cast iron pipes 1 by rotary cutters 14j is given to cast iron pipes 1 and split sleeve 16 by side expanding rollers 20, by which as shown in FIG. 12(a), it is possible to split cast iron pipes 1, joints, split sleeves 16, and repairing parts.

If cutting part 11 formed as mentioned hereinabove is traveled in the inside of cast iron pipes 1, cutting edges 14 provided on shank 14a arranged on the most forward side act as a guide so that it is possible to coincide the axis of main body 11a with the axis of cast iron pipe 1. Then grooves 1b are formed in the inner wall of cast iron pipes 1 by cutting edges provided on shanks 14b to 14i following first shank 14a, and the grooves 1b are grown deeper in order. Further, it is possible to surely split cast iron pipes 1 into arc-shaped pieces, and besides to split sleeves 16 having the diameter larger than that of cast iron pipes 1, by rotary cutters 14i provided (on a main body 12a of expanding part 12) behind shank 14i.

Expanding part 12 comprises a tapered main body 12a. A plurality of expanding rollers 18a to 18f are arranged rotatably at preset intervals in the axial direction and between cutting edges 14 on the outer side of the main body 12a. The diameters of expanding rollers 18a to 18e become larger in order corresponding to the taper or inclination of main body 12a from the forward side (the side of cutting part 11) toward the backward side (the side of connecting part 13), by which the expanding part 12 is formed so as to be able to deflect arc-shaped pieces 1a into a given shape.

Expanding rollers 18a to 18f disposed from the forward side toward the backward side are composed of four rollers, respectively, wherein the circle connecting tips of the rollers of each expanding roller 18a to 18f becomes larger in order, and expanding rollers 18e and 18f are equal to the desired inner diameter of tunnel 7.

Four rollers forming each expanding rollers 18a to 18f are supported rotatably on shaft 19 attached to main body 12a. A central part of the outer surface of each roller in the direction of the thickness is formed into the curved shape corresponding to the inner wall of cast iron pipes 1, and both sides (laterals) of the central parts are formed into tapered parts. Further, four rollers can be rotated while the tapered parts of the outer surfaces of four rollers are brought into contact with each other. By such a structure, it is possible that forces given to the individual rollers compensate each other when expanding arc-shaped pieces 1a.

Existing pipes 1 are split from positions of shank 14i. Namely, on the backward side of shank 14i, arc-shaped pieces 1a are formed into cantilever-like pieces having supporting points at the position of shank 14i. Further, expanding rollers 18a, 18b arranged on the upper course in expanding part 12 are arranged on the circular arc having a center Oa positioning on the outer side of existing pipe 1, while expanding rollers 18c, 18d are arranged on the circular arc having a center Oa positioning on the inner side of existing pipe 1.

Expanding rollers 18a, 18b perform the function of producing deflection δ in arc-shaped piece 1a in such a direction that the radius of existing pipe is increased, by which it is possible to apply concentrated load which can resist against the ground pressure, to expanding rollers 18a, 18b while traveling pipe replacement device A.

The above-mentioned deflection δ of arc-shaped pieces can be introduced by the equation: $\delta=(Wl^3)/(3EI)$, and radius of curvature R can be introduced by the equation: $R=(EI)/M$. In the above-mentioned two equations, W is load applied to arc-shaped pieces by expanding rollers 18a, 18b, l is the distance between shank 14i and expanding roller 18a and the distance between expanding rollers 18a, and 18b, E is modules of longitudinal elasticity, I is moment of inertia of area, and M is bending moment given to arc-shaped piece 1a.

The deflection δ produced in arc-shaped pieces 1a is needed to be within the limit of elasticity of cast iron of material of existing pipe. In cast iron pipes 1, if the amount of deflection becomes larger, a fear of cast iron pipe being broken increases. Further, when arc-shaped pieces 1a are broken, it becomes difficult to protect satisfactorily the tunnel formed of new pipes in the ground by arc-shaped pieces 1a.

Expanding rollers 18b to 18d produce the function of positioning arc-shaped pieces 1a at a circular pitch on the circle corresponding to the desired tunnel 7a, and pressing each arc-shaped piece 1a into the ground so as to consolidate the circumferential earth. Namely, the ground pressure applied to arc-shaped pieces 1a, in which the deflection is produced in the direction of expanding of the circle connecting arc-shaped pieces 1a, produces the deflection which makes the arc-shaped pieces 1a parallel to the center line of original cast iron pipes 1. In this case, the uniformly distributed load w of the ground pressure is applied to arc-shaped pieces 1a. Accordingly, the deflection δW of arc-shaped pieces 1a can be introduced by the equation: $w=(wl^4)/(8EI)$.

The tapered angle of a line connecting tips of expanding rollers 18a to 18f in expanding part 12 cannot be unitarily determined. It is determined in such a manner that the deflection of arc-shaped pieces 1a is within the limit of elasticity. Namely, the tapered angle is determined suitably according to material of existing pipes to be replaced.

Connecting part 13 is provided on the main body 12a of expanding part 12. The connecting part 13 is comprised of chuck 13 for holding a front end of PE pipe.

Guides 17, which are formed in the main body 12a of expanding part 12, are provided on the backward side of shanks 14f to 14i of cutting part 11. This guides 17 are formed into wedge so as to accommodate a change of the distance between arc-shaped pieces 1a according to expanding of the circle connecting arc-shaped pieces by expanding rollers 18a to 18e. Further, the diameter of the circle connecting upper surfaces 17a of guides 17 is determined to be nearly equal to the value of the diameter of the desired tunnel 7 regardless of the taper of the main body 12a of expanding part 12. Namely, upper surfaces 17a of guides 17 is formed parallel to the axis of main body 12a.

A case where cast iron pipes 1 of gas service pipeline are replaced with PE pipes by means of the pipe replacement device formed as mentioned hereinabove is explained. An end of pull-rods 5, which are inserted into the inside of cast iron pipes 1 are connected with the main body 1a of cutting part 11, and PE pipes are connected with connecting part 13.

Then, pull-rods 5 are drawn toward the side of drawing shaft 3 by driving drawing device 4 so that pipe replacement device A is traveled together with drawing by drawing device 4. While pipe replacement device A is traveled, the inner walls of cast iron pipes 1 are cut by cutting edges 15a provided on shanks 14a to 14i so that grooves 1b are formed, the cast iron pipes 1 are split staring from the grooves 1b into a plurality of arc-shaped pieces 1a.

Together with the following traveling of pipe replacement device A, cast iron pipes 1 are split surely into a plurality of arc-shaped pieces 1a, and the deflection of arc-shaped pieces 1a is produced in the direction of expanding of the radius of the circle connecting arc-shaped pieces within the limit of elasticity by expanding rollers 18a to 18e. As a result, arc-shaped pieces are pressed into the ground, respectively, by which the circumferential ground is consolidated. Namely, the ground against arc-shaped pieces 1a is guided by arc-shaped pieces 1a, and earth between arc-shaped pieces 1a is guided by upper surfaces 17a of guide 17, so that the ground around arc-shaped pieces and earth is consolidated firmly, by which a tunnel 7 surrounded by the ground and arc-shaped pieces 1a is formed. Together with the forming of tunnel 7, PE pipes 6 connected with connecting part 13 are drawn into the tunnel 7.

Figure 12B:
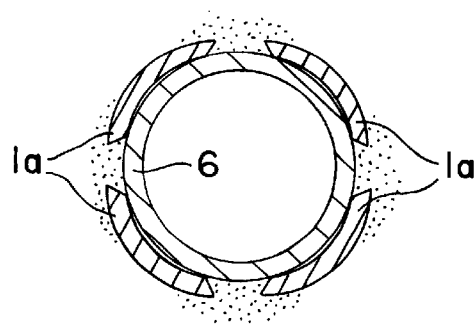

Then the state immediately after laying of PE pipes and the state after the considerable lapse of time are shown in FIG. 12. In the state immediately after laying of PE pipes, as shown in FIG. 12(a), there are gaps 21 between the inside of split and expanded split sleeves and arc-shaped pieces 1a and the outside of PE pipes. However, together with the lapse of time, arc-shaped pieces 1a are made come closely into contact with PE pipes under the ground pressure as shown in FIG. 12(b), so that arc-shaped pieces 1a made of cast iron disposed around PE pipes 6 at the same pitch are held together as a unit with PE pipes, by which a pipeline composed of PE pipes protected by protective armors formed of arc-shaped pieces can be formed.

As mentioned hereinabove, the strength of pipelines against the ground pressure can be improved by protecting PE pipes by a plurality of arc-shaped pieces 1a made of cast iron. Particularly, since the protective armor formed of a plurality of arc-shaped pieces 1a is provided along a pipeline made of PE pipes, when carrying out the open-cut construction round laid PE pipes, for example, by means of backhoe, PE pipes can be protected from claws of back-hoe.

Thereafter, after unit length of pull-rods 5 are drawn by drawing device 4, the pull-rods 5 are detached from coupler 5a. Then, rod fixture 4e are moved from the backward side toward the forward side. When the rod fixture 4e is arrived at the forward position, coupler 5a is attached to the next pull rods, and the following drawing of pipe replacement device A toward drawing shaft 3 is carried out. At the time when pipe replacement device A is arrived at drawing shaft 3, cast iron pipes 1 between starting shaft 2 and arrival shaft 3 are replaced with new pipes 1.

In the above-mentioned example, cutting part 11 and expanding part 12 are disposed at four points on a circle that divides the circle into four equal circumferential parts. However, this invention cannot be limited into the number of dividing of the circle. It is possible to increase or decrease suitably the number of dividing of the circle according to the condition of the diameter, material and others of existing pipes 1. Further, when a circle is divided, it is not necessary to divide a circle into equal circumferential parts, however it is possible to divide a circle into unequal circumferential parts.

Figure 13:
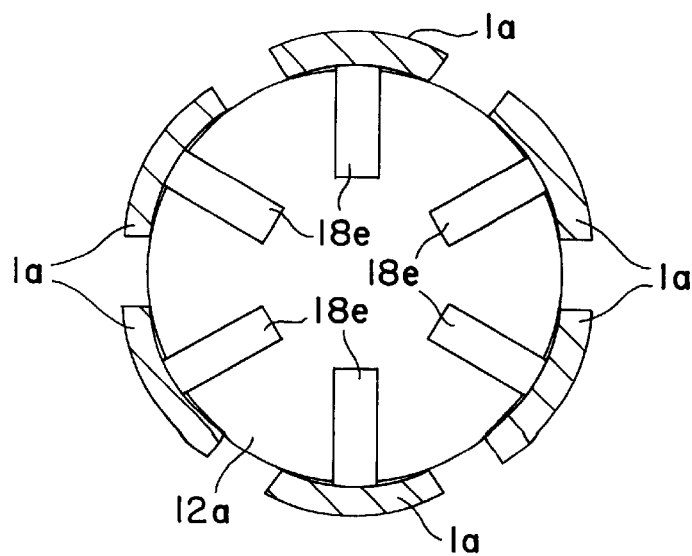
FIG. 13 is a sectional view of expanding parts wherein the expanding parts are arranged in six angular positions into which the circumference is divided.
Figure 14A:
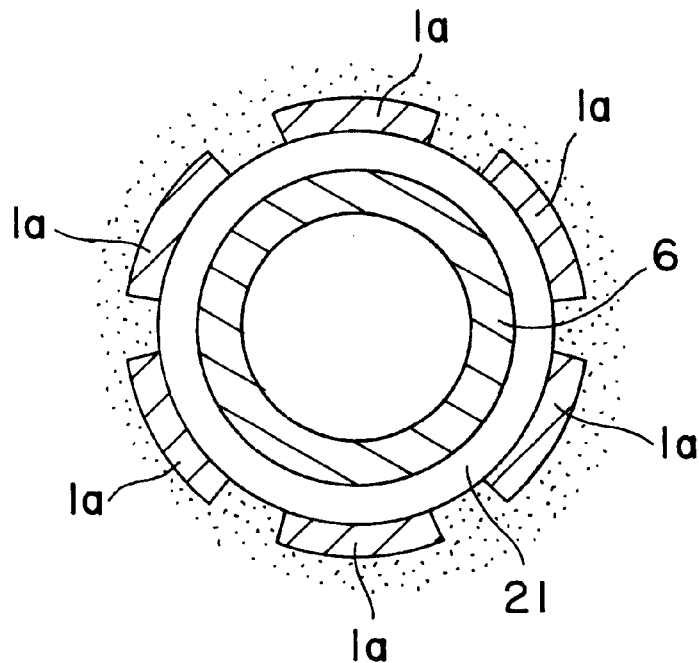
FIGS. 14(a), (b) are sectional views for explaining the state of new pipe being buried.
Figure 14B:
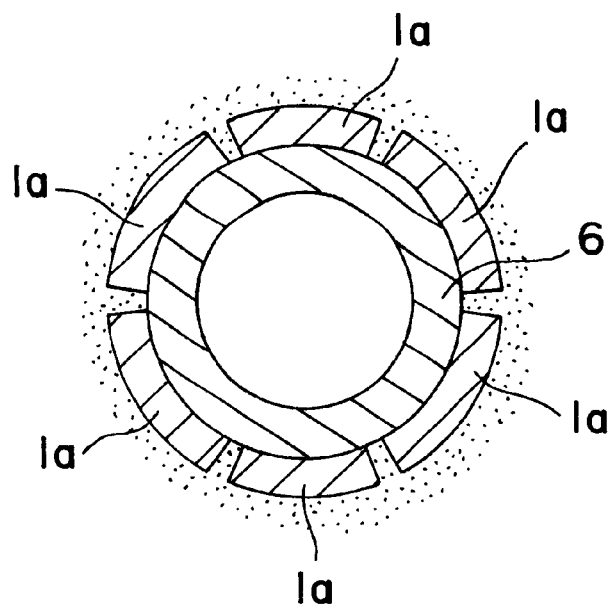

For example, FIGS. 13 and 14 shows sectional views of cutting parts 11 and expanding parts 12 in which the outer sides of cutting parts 11 and expanding parts 12 are divided into six equal circumferential parts. In such a manner, it is possible to split existing pipes into six arc-shaped pieces by means of the cutting part 11 in which the outer sides thereof is divided into six equal circumferential parts, and give the deflection within the limit of elasticity to each arc-shaped piece 1a to press each arc-shaped piece into the ground by means of the expanding part 12 in which the outer sides thereof is divided into six equal circumferential parts, and thereby form a space 21m and draw PE pipes into the space.

In any case, into how many arc-shaped pieces to split the wall of existing pipes 1 is determined as follows. In order to produce the deflection δ in arc-shaped pieces without breaking arc-shaped pieces 1a, modules of longitudinal elasticity E is determined according to material of existing parts 1a, and deflection δ is set according the condition of length of expanding part 12 and others. Then, the number of dividing of existing pipe is determined according to the width of arc-shaped pieces 1a which satisfies moment of inertia of area I calculated from the above-mentioned modules of longitudinal elasticity E and the deflection δ.

In the above-mentioned example, cutter bodies 14 comprised of plate-like shanks 14a to 14i are provided on main body 11a, by which cutting part 11 is formed. However, in the present invention, a cutter as cutting tool is not restricted to the above-mentioned cutter bodies. As shown in FIG. 15, it is possible to use preferably the cutter bodies having continuous cutting edges 22 comprised of a plurality of cutting edges which stand in line. When attaching such continuous cutting edges 22 to main body 11a, it is needed to fix the continuous cutting edges to the main body 11a with the incline corresponding to the length of main body 11a and the final depth of grooves 1a formed in cast iron pipes 1. Particularly, when using the continuous cutting edges 22, since there is a fear of the continuous cutting edges 22 being broken when a force is applied to main body 11a in the rotating direction, as shown in FIG. 15(b), it is preferable to strengthen the continuous cutting edges 22 with trapezoid block 11b.

Further, it is possible to use a broach(not shown in the drawings) as cutting bodies. As such a broach, a broach can be used in which the broach has the square section as shown in FIG. 5, and four cutting edges are integral parts of the broach or a broach corresponding to grooves 1b to be formed in the inner wall of cast iron pipes 1 can be used.

Figure 16:
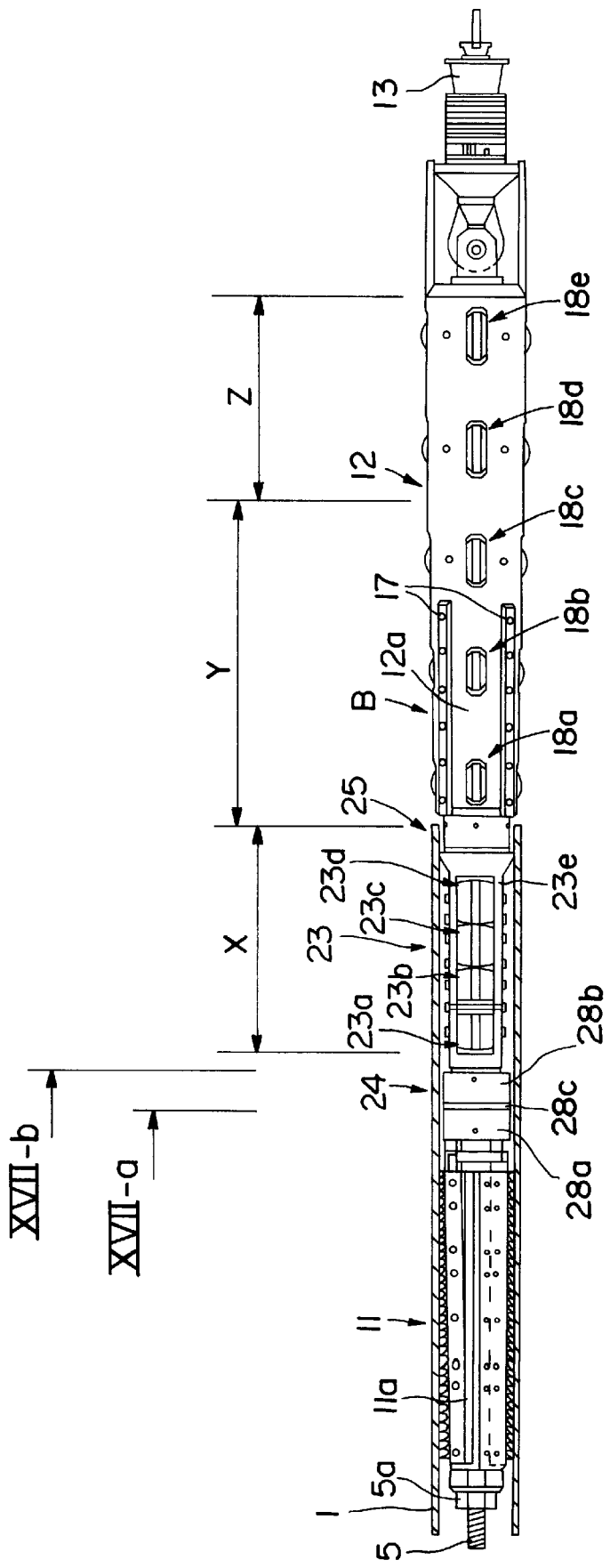
FIG. 16 is a view for explaining the construction of a pipe replacement device regarding the second embodiment.

In the above-mentioned pipe replacement device A, cutting part 11, expanding part 12 and connecting part 13 are held together as a unit. Therefore, in case of bending of a pipeline made of cast iron pipes 1 being caused by the land subsidence and others, there is a fear that heavy bending forces generated with the bending of a pipeline made of cast iron pipes 1 are imposed upon pipe replacement device A so that breaking of cutting edges 15a is generated or shanks 14a to 14i are broken. Accordingly, a pipe replacement device B according to a second embodiment of the present invention is preferably provided, in which the pipe replacement device B includes a flexible joint as shown in FIG. 16 so that the pipe replacement device B can follow the bending of a pipeline made of cast iron pipes 1 even in the case where the bending of a pipeline made of cast iron pipes 1 has been formed. Then, referring to FIGS. 16 and 17, wherein like reference characters designates the same parts as in the first embodiment A or parts which functions in the same manner as in the first embodiment A, and the explanation upon them is omitted, the structure of pipe replacement device B according to the second embodiment is explained in detail.

As shown in FIGS. 16, 17, pipe replacement device B has a dividing part 23 between cutting part 11 and expanding part 12. Bending joints 24, 25 are arranged between cutting part 11 and dividing part 23 and between dividing part 23 and expanding part 12, respectively. Namely, pipe replacement device B has two articular parts by the two bending joints 24, 25 being provided in pipe replacement device B, by which even in the case where the bending of a pipeline made of cast iron pipes 1 has been generated, the pipe replacement device B can sufficiently follow the bending of a pipeline made of cast iron pipes 1 by realizing the relative free displacement of cutting part 11 and expanding part 12 by means of bending joints 24, 25.

The dividing part 23 has the same function as in side expanding rollers 20. Namely, dividing part 23 splits cast iron pipes 1 having grooves 1b which has been formed in cutting part 11 by forces applied to cast iron pipes 1 forces to form arc-shaped pieces 1a. Particularly, the dividing part 23 of pipe replacement device B applies to cast iron pipes 1 in the vertical direction to split the cast iron pipes, and at the same time breaks bolts by which split sleeves 16 are connected with each other. Accordingly, cast iron pipes 1 can be surely split regardless of forms and materials of split sleeves 16 or other pipe joints.

Therefore, dividing part 23 is provided with a plurality of dividing rollers 23a to 23d. Each dividing roller is composed of a pair of rollers which are arranged so that the outsides of a pair of rollers are located on a line of vertical direction. Dividing rollers 23a to 23d are disposed at a given pitch in the axial direction of cast iron pipes. Rollers forming each dividing rollers 23a to 23d have crowns which can be made into contact with the inside of cast iron pipes, respectively. The above-mentioned rollers forming each dividing rollers are mounted rotatably on a shaft attached to a main body 23e. Diameters of rollers forming one dividing roller of dividing rollers 23a to 23d have different from those of rollers forming another dividing roller of dividing rollers 23a to 23d so that forces corresponding to a change in diameter of roller of from dividing roller 23a to dividing roller 23d can be applied to cast iron pipes 1 in the vertical direction. Further, a pair of rollers forming each dividing rollers 23a to 23d are brought into contact with each other, by which reaction forces can be supported when splitting cast iron pipes 1.

Bending joint 24 is comprised of two balls 26. One ball 26 is secured to main body 11a of cutting part 11 through screw 27 (as shown in FIG. 17(b)) and another ball 26 is secured to main body 23e of dividing part 23 through another screw 27. These balls 26 are seated rotatably within casting members 28a, 28b, 28c, which are divided into three parts, respectively, by which the cutting part 11 can bend to the dividing part 23.

Namely, each of the balls 26 have a spherical part exceeding at least hemisphere, wherein the spherical part has a plane intersecting with spherical surface off a center of sphere. Each ball 26 is provided with a screw 27 on the opposite to the plane. Each of the casing members 28a, 28b is formed with a hole through which a screw 27 can be pass, with a semispherical seat for receiving a half of ball 26 formed on the side of screw 27a, and with female screw (not drawn in the drawings) having sufficiently larger than the diameter of ball 26 and being an integral part of the seat. Further, casing member 28c is formed with a male screw which is engaged with female screws formed in each of casing members 28a, 28b, on both outsides of the casing member 28c, and with a seat for receiving the side of ball 26 at which the plane is formed, inside the casing member 28c.

Then, a procedure of forming the above-mentioned bending joints 24 is explained. First, under the state where screws 27 are fitted in main body 1a of cutting part 1 and main body 23e of dividing part 23, respectively, the screws 27 are engaged with balls 26, and locking of screws 27 with balls 26 is made, respectively. In this state, cutting part 11 is not connected with dividing part 23. Thereafter, both balls 26 are opposed to each other, wherein female screws of casing members 28a, 28b are engaged with male screws of casing member 28d, and locking of the screws of casing members 28a, 28b with male screws of casing member 28c is made, respectively, so that balls 28 are seated inside casing members 28a, 28b, 28c so as to be rotatable on casing members 28a, 28b, and 28c, by which the degree if freedom of bending of cutting part 11 against dividing part 23 can be obtained.

The bending joint 24 formed as mentioned hereinabove enables for drawing forces in the axial direction of cast iron pipes to be transmitted by contact of the surface of balls 26 with the seats formed on the inside of casing members 28a, 28b, and 28c.

Bending joint 25 is in the same manner as the above-mentioned bending joint 24, wherein ball 26 is connected with main body 12a of expanding part 12, however main body 23e of dividing part 23 is directly connected with casing member 28c. Though range of bending angle in bending joint 25 formed as mentioned hereinabove is narrow as compared with the above-mentioned bending joint 24, bending joint 25 does not differ from bending joint 24 in function.

In pipe replacement device B formed as mentioned hereinabove, when a pipeline of cast iron pipes 1 has been bent, bending joints 24, 25 are displaced corresponding to the bending of pipeline so that dividing part 23 are leaned against cutting part 11, while expanding parts 12 are leaned against dividing part 23, by which excessive twisting force cannot be given to the whole of pipe replacement device B. Accordingly, there is no fear that cutting edges 15a are broken, since drawing force of pipe replacement B is unnecessary to be increased.

As explained in detail, in a method for replacement of existing pipes according to the present invention, it is possible to split existing pipes into arc-shaped pieces being adjacent to each other at a given circumferential pitch, while drawing new pipes into a space surrounded by arc-shaped pieces, so that a pipeline formed of new pipes and protective armors which are made closely into contact with the new pipes to be integrated with new pipes. Accordingly, regardless of the inner diameter of existing pipes, it becomes possible to carry out the construction of replacement of existing pipes in one process, and therefore to reduce a term of works.

Particularly, by dividing the circumference of existing pipes at the preset angular intervals to form a plurality of arc-shaped pieces, it is possible to press the arc-shaped pieces into the ground with merely handling the arc-shaped pieces as cantilevers, without consideration about expanding of arc-shaped pieces in the circumferential direction. Accordingly, even if material of existing pipes has the brittleness as cast iron, it is possible to form arc-shaped pieces in a favorable state and press them into the ground, and besides to consolidate the ground together with pressing of arc-shaped pieces into the ground, by forming expanding means into a shape with such an incline that the deflection within the limit of elasticity of material of existing pipes can be produced in arc-shaped pieces.

Further, in a pipe replacement device, it is possible to produce the deflection in arc-shaped pieces, and press the arc-shaped pieces into the ground together with consolidating of the ground, by expanding rollers mounted on expanding means. Accordingly, a tunnel-like space surrounded by arc-shaped pieces pressed into the ground and consolidated ground. Further, protective armors formed of arc-shaped pieces disposed around new pipes can be formed by drawing new pipes into the tunnel-like spaces together with the forming of the tunnel-like space.

Further, since cutting means has cutter bodies in which cutting edges are arranged in a line in such a manner that the distance between a center of the cutting means and tips of the cutting edges becomes larger in order forward side toward the backward side, grooves can be formed in the inner wall of cast iron pipes together with the forward movement of cutting means, so that splitting of existing pipes can be achieved surely.

Further, by providing side expanding rollers for giving a force of the diametral direction and rotary cutters to existing pipes behind cutting means, it is possible to split joints of existing pipes or sleeves for branch pipe or repairing parts in a favorable state. Accordingly, even if any parts are attached to buried joints, these parts can be split in the same manner as in existing pipes.

Further, by providing a guide behind cutter bodies, it is possible to surely split existing pipes and guide expanding of the circle connecting arc-shaped pieces.

What is claimed is:

1. A pipe replacement device wherein the device is traveled in the existing pipes to be replaced in such a manner that the existing pipes can be split in a longitudinal direction into a plurality of arc-shaped pieces, the arc-shaped pieces are pressed into the ground so as to form a space surrounded by a plurality of the arc-shaped pieces and portions of consolidated ground, and then introducing of new pipes into the space is made, the pipe replacement device comprising:

cutting means arranged on the forward side of the device;

an expanding means following the cutting means; and a connecting means following the expanding means, said connecting means connecting the expanding means with new pipes, wherein the cutting means is provided with cutter bodies, each of the cutter bodies including a plurality of cutting edges arranged in a line and comprising a plurality of plate-like shanks arranged coaxially wherein carbide tips are planted on the outside of the respective shanks at angular intervals in the circumferential direction to form the cutting edges, distances between a center of the respective shanks and tips of the cutting edges on the respective shanks differing from each other, said shanks being mounted on a main body of the cutting means in such a manner that distances between a center of the main body and tips of the cutting edges become larger in order from the forward side toward the backward side of the main body so that each of said bodies having the cutting edges arranged in a line is formed, by which the cutting means are formed of the cutting bodies, expanding means having groups of a plurality of expanding rollers, the expanding rollers in each group being arranged adjacent to each other at regular intervals in the circumferential direction at angular positions corresponding to spaces between the cutter bodies arranged in the circumferential direction.

2. A pipe replacement device as claimed in claim 1, wherein said pipe replacement device further comprises side expanding rollers arranged on the backward side of the cutter bodies for expanding the existing pipes in the diametric direction in such a manner that the width of groove positioning along a line intersecting perpendicularly to the diametric direction can be increased, and further wherein said side expanding rollers are provided with rotary cutters for splitting of joints of the existing pipes, sleeves for branch pipe or replacing parts at the backward side of the side expanding rollers, each of the side expanding rollers has a cylindrical surface in central portion in the direction of the thickness of the outer surface of each side expanding roller and curved or tapered surface adjacent to the cylindrical surface on upper and lower sides of the cylindrical surface, and wherein the curved or tapered surfaces are brought into contact with the inner wall of the existing pipes, while the cylindrical surfaces of the side expanding rollers are brought into contact with each other.

3. A pipe replacement device as claimed in claim 1, wherein the expanding means has a tapered main body, a plurality of the expanding rollers are arranged about a point on an axial center line, each of the expanding rollers has a circumferential surface and both tapered laterals are adjacent to the circumferential surface, said circumferential surface is brought into contact with the inner wall of the existing pipes while the tapered laterals are brought into contact with each other.

4. A pipe replacement device as claimed in claim 1, wherein the pipe replacement device comprises guides for adjusting spaces between arc-shaped pieces formed by splitting of the existing pipes while a circle connecting the adjacent arc-shaped pieces are expanded, said guides being formed into wedges so as to accommodate a change in the distance between arc-shaped pieces according to the circle connecting arc-shaped pieces by expanding rollers at positions which corresponds to the positions of the cutting means, on the outside of a tapered main body of the expanding means.

5. A pipe replacement device wherein the device is traveled in the existing pipes to be replaced in such a manner that the existing pipes can be split in the longitudinal direction into a plurality of arc-shaped pieces, the arc-shaped pieces are pressed into the ground so as to form a space surrounded by a plurality of the arc-shaped pieces and portions of consolidated ground, and then introducing of new pipes into the space is made, the pipe replacement device comprising:

cutting means arranged on the forward side of the device;

an expanding means following the cutting means; and connecting means following the expanding means, said connecting means connecting the expanding means with new pipes, wherein the cutting means is provided with cutter bodies, each of the cutter bodies including a plurality of cutting edges arranged in a line, and the cutting edges comprise continuous cutting edges formed in such a manner that distances between the center of the cutting means and tips of the cutting edges become larger in order from the forward side toward the backward side of the cutter bodies and the continuous cutting edges are mounted in a main body of the cutting means of circumferential intervals, wherein an expanding means has groups of a plurality of expanding rollers, and the expanding rollers in each group are arranged to be adjacent to each other at regular intervals in the circumferential direction at angular positions corresponding to spaces between the cutter bodies arranged in the circumferential direction.

6. A pipe replacement device as claimed in claim 5, wherein said pipe replacement device further comprises side expanding rollers arranged on the backward side of the cutter bodies for expanding the existing pipes in the diametric direction in such a manner that the width of groove positioning along a line intersecting perpendicularly to the diametric direction can be increased, wherein said side expanding rollers are provided with rotary cutters for splitting of joints of the existing pipes, sleeves for branch pipe or replacing parts at the backward side of the side expanding rollers, each of the side expanding rollers has cylindrical surface in central portion in the direction of the thickness of the outer surface of each side expanding roller and curved or tapered surface to the cylindrical surface on upper and lower sides of the cylindrical surface, and wherein the curved or tapered surfaces are brought into contact with the inner wall of the existing pipes, while the cylindrical surfaces of the side expanding rollers are brought into contact with each other.

7. A pipe replacement device as claimed in claim 5, wherein the expanding means has a tapered main body, a plurality of the expanding rollers are arranged about a point on an axial centerline, each of the expanding rollers has a circumferential surface and both tapered laterals adjacent to the circumferential surface, said circumferential surface is brought into contact with the inner wall of the existing pipes while the tapered laterals are brought into contact with each other.

8. A pipe replacement device as claimed in claim 5, wherein the pipe replacement device comprises guides for adjusting spaces between arc-shaped pieces formed by splitting of the existing pipes while a circle connecting the adjacent arc-shaped pieces are expanded, said guides being formed into wedges so as to accommodate a change in the distance between arc-shaped pieces according to the circle connecting arc-shaped pieces by expanding rollers, at positions which corresponds to the positions of the cutting means, on the outside of a tapered main body of the expanding means.

* * * * *